Dec. 8, 1959  W. W. REAGAN  2,915,885
VEHICLE COOLING DEVICE
Filed Jan. 9, 1958
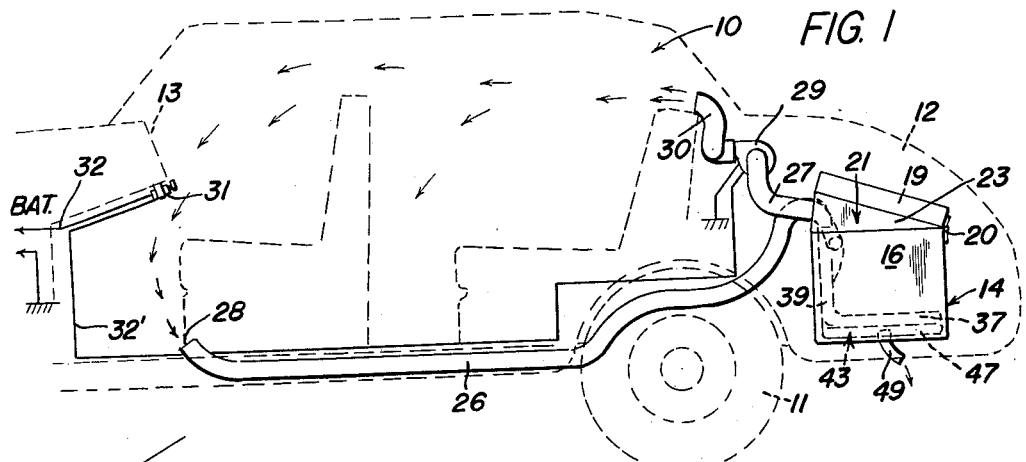
FIG. 1
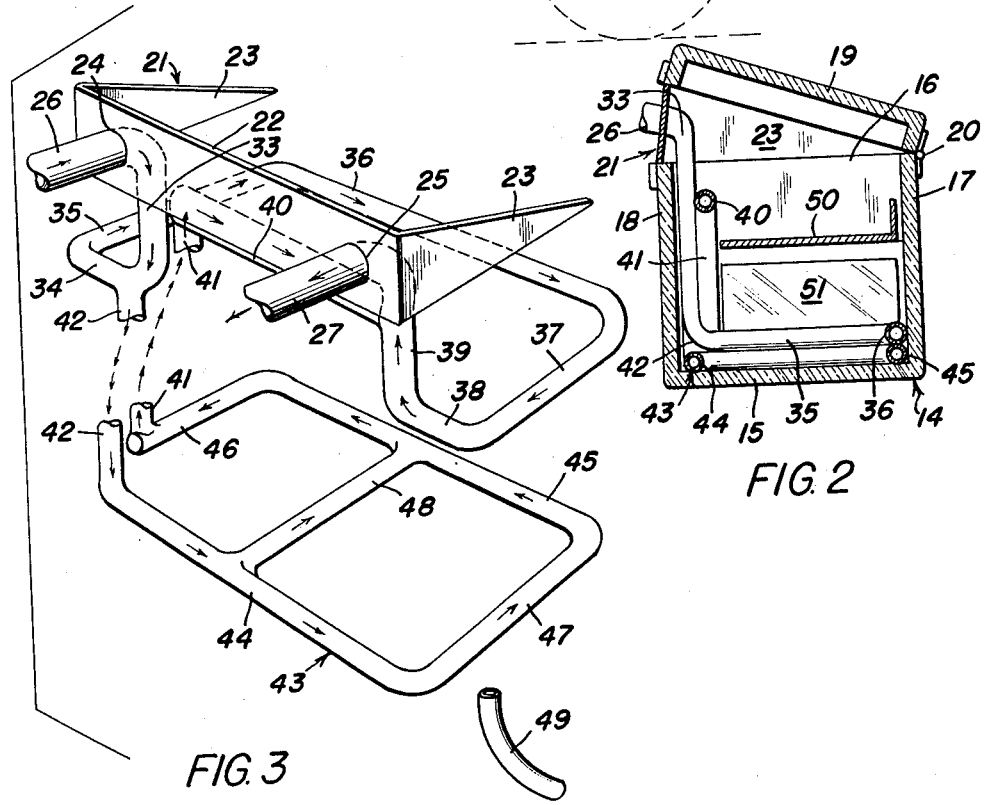
FIG. 2
FIG. 3
INVENTOR.
Walter William Reagan
BY Victor J. Evans &Co.
ATTORNEYS United States Patent Office 2,915,885
Patented Dec. 8, 1959

2,915,885

VEHICLE COOLING DEVICE

Walter William Reagan, San Antonio, Tex.

Application January 9, 1958, Serial No. 708,035

3 Claims. (Cl. 62—425)

This invention relates to a cooling device, and more particularly to a cooling device for a vehicle such as an automobile.

The object of the invention is to provide a cooling device which includes a chest or container that is adapted to be arranged in the trunk of a vehicle, whereby the interior of the vehicle can be effectively cooled so that persons within the vehicle may ride in comfort during periods of hot or warm weather.

Another object of the invention is to provide a vehicle cooling device which includes a chest that is adapted to be arranged in the trunk of an automobile, whereby cool air can be conveniently supplied or furnised to the interior of the automobile, and wherein the chest can also be used for holding perishable articles such as foodstuffs which should be kept cool.

A further object of the invention is to provide a vehicle cooling device which is extremely simple and inexpensive to manufacture.

Other objects and advantages will be apparent during the course of the following description.

In the accompanying drawings, forming a part of this application, and in which like numerals are used to designate like parts throughout the same.

Figure 1 is an elevational view illustrating the vehicle cooling system of the present invention and showing the vehicle in broken lines.

Figure 2 is a vertical sectional view showing the chest which is mounted in the trunk of the vehicle.

Figure 3 is a perspective view illustrating the arrangement of the pipes or conduits which form part of the cooling system.

Referring in detail to the drawings, the numeral 10 indicates a conventional vehicle or automobile which includes the usual rear wheels 11 and trunk 12, Figure 1, and the vehicle further includes the usual dashboard or instrument panel 13.

The numeral 14 indicates a chest or container which is hollow and which is arranged in the trunk 12 of the vehicle, and the chest 14 includes a horizontally disposed bottom wall 15, spaced parallel vertically disposed end walls 16, and back and front walls 17 and 18 which are also vertically disposed. The numeral 19 indicates a lid which is hingedly connected to the back wall 17 by means of hinges 20, Figure 2.

There is further provided a support member 21, and the support member 21 incudes a rectangular intermediate portion 22 which serves to hold the lid 19 in open position when the support member 21 is positioned between the lid 19 and the top of the chest. The support member 21 further includes spaced parallel vertically disposed triangular side members 23. The portion 22 of the support member 21 is provided with a pair of spaced apart apertures 24 and 25, and first and second conduits 26 and 27 extend through the apertures 24 and 25, respectively. The conduit 26 may extend along the lower portion of the vehicle 10, and the front end 28 of the conduit 26 is open whereby air from the interior of the vehicle can enter the opening 28 and be drawn rearwardly through the conduit 26 so that this air can be continually cooled as later described in this application. The second conduit 27 leads to a conventional blower 29 which may be operated by an electric motor, and an outlet conduit 30 leads from the blower 29, the outlet conduit 30 serving to convey cool air into the interior of the vehicle 10 so that persons within the vehicle can ride in comfort during hot weather. The numeral 31 indicates a manually operable switch or control member which is adapted to be arranged adjacent the dashboard 13 of the vehicle, and the switch 31 has wires 32 and 32' extending therefrom whereby the switch can be connected into the electrical circuit of the vehicle and to the motor which operates the blower 29. Thus, the driver of the vehicle can operate the switch 31 so as to turn the blower 29 on or off.

There is further provided a conduit means which serves to connect together the conduits 26 and 27 and this conduit means comprises a first vertically disposed portion or pipe section 33 which extends downwardly from the conduit 26, and the portion 33 terminates in or communicates with a horizontally disposed right angularly arranged second portion 34. As shown in Figure 3, the portion 34 terminates in a right angularly arranged third portion 35, and the portion 35 terminates in a right angularly arranged fourth portion 36, there being a fifth portion 37 arranged at right angles with respect to the portion 36. The portion 37 terminates in a right angularly arranged portion 38, and extending upwardly from the portion 38 is a portion 39. The portion 39 communicates with the second conduit 27. As shown in the drawings, the portions 34, 35, 36, 37 and 38 all lie in the same plane and all are horizontally disposed. An eighth portion 40 extends from the seventh portion 39 and communicates therewith. A ninth portion 41 extends downwardly from an end of the eighth portion 40, and spaced from the ninth portion 41 is a tenth portion 42 which is also vertically disposed, and the upper end of the portion 42 communicates with the second portion 34.

Arranged in the bottom of the chest 14 is a lower coil section which is indicated generally by the numeral 43, and the coil section 43 includes spaced parallel horizontally disposed side portions 44 and 45, as well as spaced parallel horizontally disposed end portions 46 and 47, and there is provided a connecting portion 48 which extends between the side portions 44 and 45. The various previously described portions are all hollow and the portion 46 is connected to the lower end of the portion 41. The portion 44 is connected to the lower end of the portion 42.

The chest 14 is provided with a drain pipe 49 which can be used for draining water from the bottom of the chest and this drain pipe may extend through the floor of the trunk 12. A suitable valve can be provided for the drain pipe 49 so as to control the flow of water therethrough. A tray 50 may be arranged in chest 14 for holding perishable articles such as foodstuffs which are to be kept cooled, and the tray 50 may be removable. The numeral 51 indicates a cake of ice which is arranged in the chest, and the cake of ice serves as a cooling medium.

From the foregoing, it is apparent that there has been provided a cooling system for a vehicle such as an automobile whereby persons within the automobile will be able to ride in greater comfort even during hot or warm weather. It is to be noted that according to the present invention, the chest 14 is arranged in the trunk 12 of the automobile 10, and the trunk 14 has a cake of ice 51 or other cooling medium therein. The various conduits are arranged as previously described, and it will be seen that with the parts arranged as shown in the drawings, the switch 31 can be manually actuated so that an electrical circuit can be completed through the wires 32 and 32' to cause operation of the blower 29. This will cause air to travel in the direction indicated by the arrows in Figure 1 so that the warm air from the interior of the vehicle will enter the opening 28 in the front end of the conduit 26, and this warm air will travel rearwardly through the conduit 26 and at the same time air which has been cooled will be sucked through the conduit 27 and blown out through the conduit 30 into the interior of the vehicle. Thus, a continuous circulation of cool air is provided whereby persons within the vehicle will be able to travel in greater comfort. When the blower 29 is not being used, the switch 31 can be turned to "off" position.

The pipe 49 serves as a drain pipe for water from the chest 14, and the lid 19 of the chest is held in open position by means of the support member 21. Support member 21 includes the member 22 which has the openings 24 and 25 therein whereby the conduits 26 and 27 can extend through these openings.

The conduit means which causes the air to be cooled from the cake of ice 51, consists of the coil section 43 which has a substantially rectangular formation, and the coil section 43 is arranged in the bottom of the chest 14. The connecting portion 48 can serve as a means whereby the cake of ice 51 will be prevented from accidentally shifting back and forth as the vehicle moves along a roadway or the like. It is to be noted that the warm air to be heated passes rearwardly through the conduit 26, and then passes through the conduit or portion 33, and then passes through the portion 34, then through the portions 35, 36, 37, 38 and 39. Some of the warm air to be cooled passes from the portion 34 down through the portion 42 and into the portion 44 and then this air passes through the portion 47 and then through the portion 45 and then through the portion 46 and up through the portion 41 into the portion 40. From the portion 40 and from the portion 39, the cool air enters the conduit 27 and the blower 29 then forces this cool air into the interior of the vehicle. The various conduit portions are arranged in the chest in close contact with the cake of ice 51 or with the cold water in the chest so that air passing through these portions is properly cooled to the desired temperature. The tray 50 is removably mounted above the cake of ice 51, and the tray 50 may be used for holding perishable articles such as fresh fish, foodstuffs or the like so that it will be seen that the cooling system of the present invention not only provides a means for cooling the interior of the vehicle but also provides a means for preventing perishable articles from deteriorating or becoming spoiled.

The parts can be made of any suitable material and in different shapes or sizes.

The various conduits may be made of plastic pipe or the like and by having certain of the conduits resting in ice water, there will be a tendency to prevent melting of the ice too fast. If desired, the parts can be sold in the form of a do it yourself kit whereby the apparatus can be readily installed in a vehicle by the owner of the vehicle. The vehicle air conditioner of the present invention will not heat up the vehicle engine or motor nor will it clutter up the motor and since the air conditioner does not depend upon the motor for its operation, there will be no excess use of gas or oil. Also, the present invention can be made and sold at a very low cost and operation can be carried out with a minimum of expense. The chest 14 is sufficiently large so that perishable materials such as fish, picnic supplies or the like may be conveniently carried therein. Also, in the event that articles such as fish are being carried in the chest, the conduits are arranged so that no odor from such articles will be able to enter the vehicle. When the ice 51 melts, an additional cake of ice can be readily placed in the chest. With the present invention, after a fisherman has been on a fishing trip, the fresh fish which have been caught can be carried back from the fishing spot in the chest 14, and such fish will be kept in a fresh condition even though the weather is extremely hot.

Minor changes in shape, size and rearrangement of details coming within the field of invention claimed may be resorted to in actual practice, if desired.

I claim:

1. In a cooling system for a vehicle of the type including a trunk, a chest arranged in said trunk and including a horizontally disposed bottom wall, spaced parallel vertically disposed end walls, and spaced parallel vertically disposed front and back walls, a lid hingedly connected to said back wall, said chest having a cooling medium therein, a drain pipe extending from the bottom of the chest, a support member positioned between said lid and the top of the chest, said support member including a rectangular intermediate portion provided with a pair of spaced apart apertures therein, a pair of spaced parallel vertically disposed triangular side members extending from said intermediate portion, a first conduit extending through one of said apertures and having its front end open and communicating with the interior of the vehicle, a second conduit extending through the other aperture, a blower connected to said second conduit, and conduit means arranged in said chest and connecting said first and second conduits together.

2. In a cooling system for a vehicle of the type including a trunk, a chest arranged in said trunk and including a horizontally disposed bottom wall, spaced parallel vertically disposed end walls, and spaced parallel vertically disposed front and back walls, a lid hingedly connected to said back wall, said chest having a cooling medium therein, a drain pipe extending from the bottom of the chest, a support member positioned between said lid and the top of the chest, said support member including a rectangular intermediate portion provided with a pair of spaced apart apertures therein, a pair of spaced parallel vertically disposed triangular side members extending from said intermediate portion, a first conduit extending through one of said apertures and having its front end open and communicating with the interior of the vehicle, a second conduit extending through the other aperture, a blower connected to said second conduit, conduit means arranged in said chest and connecting said first and second conduits together, said conduit means comprising a first vertically disposed portion extending downwardly from said first conduit, a second portion extending from said first portion, a third portion extending from said second portion and said third portion terminating in a fourth portion, a fifth portion extending from said fourth portion, said fifth portion terminating in a sixth portion, a seventh portion extending upwardly from said sixth portion, said seventh portion communicating with the second conduit, a horizontally disposed eighth portion extending from said seventh portion, said second, third, fourth, fifth and sixth portions lying in the same plane, a vertically disposed ninth portion extending downwardly from an end of said eighth portion, a tenth portion extending downwardly from said second portion, and a lower coil section connected to said ninth and tenth portions, said coil section being positioned in the bottom of the chest.

3. In a cooling system for a vehicle of the type including a trunk, a chest arranged in said trunk and including a horizontally disposed bottom wall, spaced parallel vertically disposed end walls, and spaced parallel vertically disposed front and back walls, a lid hingedly connected to said back wall, said chest having a cooling medium therein, a drain pipe extending from the bottom of the chest, a support member positioned between said lid and the top of the chest, said support member including a rectangular intermediate portion provided with a pair of spaced apart apertures therein, a pair of spaced parallel vertically disposed triangular side members extending from said intermediate portion, a first conduit extending through one of said apertures and having its front end open and communicating with the interior of the vehicle, a second conduit extending through the other aperture, a blower connected to said second conduit, conduit means arranged in said chest and connecting said first and second conduits together, said conduit means comprising a first vertically disposed portion extending downwardly from said first conduit, a second portion extending from said first portion, a third portion extending from said second portion and said third portion terminating in a fourth portion, a fifth portion extending from said fourth portion, said fifth portion terminating in a sixth portion, a seventh portion extending upwardly from said sixth portion, said seventh portion communicating with the second conduit, a horizontally disposed eighth portion extending from said seventh portion, said second, third, fourth, fifth and sixth portions lying in the same plane, a vertically disposed ninth portion extending downwardly from an end of said eighth portion, a tenth portion extending downwardly from said second portion, and a lower coil section connected to said ninth and tenth portions, said coil section being positioned in the bottom of the chest, said coil section comprising spaced parallel horizontally disposed end portions, spaced parallel horizontally disposed side portions, and a horizontally disposed connecting portion extending between said side portions.

References Cited in the file of this patent

UNITED STATES PATENTS

| | | |
|---|---|---|
| 2,557,004 | Lepper | June 12, 1951 |
| 2,802,347 | Marcus | Aug. 13, 1957 |